(12) United States Patent
Bovington et al.

(10) Patent No.: US 12,717,098 B2
(45) Date of Patent: Aug. 25, 2026

(54) PLUGGABLE ROADM

(71) Applicant: Cisco Technology, Inc., San Jose, CA (US)

(72) Inventors: Jock T. Bovington, Koenigstein im Taunus (DE); Matthew J. Traverso, Saratoga, CA (US); Marco Mazzini, Seville (ES)

(73) Assignee: Cisco Technology, Inc., San Jose, CA (US)

(*) Notice: Subject to any disclaimer, the term of this patent is extended or adjusted under 35 U.S.C. 154(b) by 318 days.

(21) Appl. No.: 18/166,972

(22) Filed: Feb. 9, 2023

(65) Prior Publication Data

US 2024/0272382 A1 Aug. 15, 2024

(51) Int. Cl.
*G02B 6/12* (2006.01)
*G02B 6/42* (2006.01)

(52) U.S. Cl.
CPC ....... *G02B 6/4246* (2013.01); *G02B 6/12007* (2013.01); *G02B 6/4203* (2013.01)

(58) Field of Classification Search
CPC ......................... H04J 14/0267; G02B 6/12007
See application file for complete search history.

(56) References Cited

U.S. PATENT DOCUMENTS

| | | | | |
|---|---|---|---|---|
| 5,915,051 | A * | 6/1999 | Damask | G02B 6/12007 385/9 |
| 7,824,113 | B2 * | 11/2010 | Wong | G02B 6/4246 398/135 |
| 9,116,313 | B2 | 8/2015 | Traverso et al. | |
| 9,819,436 | B2 * | 11/2017 | Younce | H04J 14/0204 |
| 10,735,126 | B1 * | 8/2020 | Koopferstock | H04B 10/25891 |
| 11,249,266 | B2 | 2/2022 | Mazzini et al. | |
| 2002/0003643 | A1 * | 1/2002 | Qian | G02B 6/29358 398/82 |
| 2014/0023373 | A1 * | 1/2014 | Tosaki | H04J 14/02122 398/83 |
| 2017/0302397 | A1 | 10/2017 | Boduch et al. | |
| 2018/0270009 | A1 | 9/2018 | Mansouri Rad et al. | |
| 2020/0204284 | A1 | 6/2020 | Huang et al. | |
| 2021/0218491 | A1 * | 7/2021 | Jones | H04J 14/0293 |
| 2021/0273721 | A1 * | 9/2021 | Menard | H04J 14/0267 |
| 2021/0273740 | A1 | 9/2021 | Chen et al. | |
| 2022/0236477 | A1 | 7/2022 | Bovington et al. | |
| 2023/0280529 | A1 * | 9/2023 | Lee | G02B 6/12 385/14 |

* cited by examiner

*Primary Examiner* — Eric Wong
(74) *Attorney, Agent, or Firm* — Patterson + Sheridan, LLP

(57) ABSTRACT

Embodiments herein describe a pluggable module that includes a ROADM implemented in a photonic integrated circuit (PIC). By implementing the ROADM in a PIC, the ROADM can be placed on smaller, pluggable modules (e.g., a Small Form-factor Pluggable (SFP) which can be a hot-pluggable network interface module).

19 Claims, 6 Drawing Sheets

600
CPO SYSTEM
401 CPO
510A
PLUGGABLE
MODULE
510B
PLUGGABLE
MODULE
510C
PLUGGABLE
MODULE
605
PLUGGABLE
FIBER AMPLIFIER
ROADM PIC
505
305
LASERS
515
WDM
FILTER
INPUT FIBER
105
OUTPUT FIBER
110

PLUGGABLE ROADM

TECHNICAL FIELD

Embodiments presented in this disclosure generally relate to integrating a reconfigurable optical add/drop multiplexer (ROADM) into a pluggable module.

BACKGROUND

An Optical Add/Drop Multiplexer (OADM) is a Wavelength Division Multiplexing (WDM) networking device that permits specific wavelengths in an optical signal to be dropped or added at the device while also allowing other wavelengths to optically pass through the device without requiring termination. OADMs enable wavelength reuse by allowing a wavelength (i.e., a channel or color) to drop from one direction without continuing through the device. However, OADMs generally cannot be modified or reconfigured after deployment, even if traffic volume and patterns need to change.

In contrast, ROADMs can adjust to changing traffic demands. ROADMs enable remote configuration (and reconfiguration) of the channels, and support more than two directions for, e.g., optical mesh-based networking. Like the OADM, the ROADM allows individual wavelengths to add and drop at a site, with the added benefit of being able to adjust the number of channels that are added/dropped versus the number of channels that pass-through the ROADM if traffic patterns change.

However, ROADMs are typically bulky and built from discrete optical components. This makes them expensive to manufacture and are typically formed on large line cards.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting, other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is a pluggable reconfigurable optical add-drop multiplexer (ROADM) that includes a pluggable body and a photonic integrated circuit (PIC) disposed in the pluggable body, the PIC comprising a ROADM.

Another embodiment presented in this disclosure is a system that includes a WDM filter configured to demultiplex a received WDM optical signal into a plurality of sets of channels, and an computing system comprising a plurality of pluggable ROADMs, wherein each of the plurality of pluggable ROADMs is configured to receive a respective set of the plurality of sets of channels from the WDM filter.

Another embodiment presented in this disclosure is as computing system is a a pluggable ROADM comprising a PIC comprising a ROADM and a CPO configured to receive a channel that is being dropped by the pluggable ROADM and provide a substitute channel, to replace the dropped channel, to the pluggable ROADM.

Example Embodiments

Embodiments herein describe a pluggable module that includes a ROADM implemented in a photonic integrated circuit (PIC). As mentioned above, ROADMs are typically made from discrete optical components, which means they are typically implemented using bulky line cards. However, by implementing the ROADM in a PIC, the ROADM can be placed on smaller, pluggable modules (e.g., a Small Form-factor Pluggable (SFP), External Laser Small Form Factor Pluggable (ELSFP), Quad Small Form factor Pluggable (QSFP), or Octal Small Form Factor Pluggable (OSFP) which can be a hot-pluggable network interface module). In one embodiment, the pluggable module can include other optical components, such as a continuous wave (CW) laser.

The pluggable module can be plugged into a co-packaged optics (CPO) system which can include a CPO where optics and an electrical application specific integrated circuit (ASIC) are on a single packaged substrate. Optical fibers can connect the pluggable module to the optics in the CPO. The CPO can also provide new optical signals to the ROADM in the pluggable module. For example, wavelengths (or channels) that are being dropped can be sent to the CPO which in turn provides new optical signal(s) (e.g., substitute channels) to the ROADM which it then adds to an output optical signal.

Figure 1:
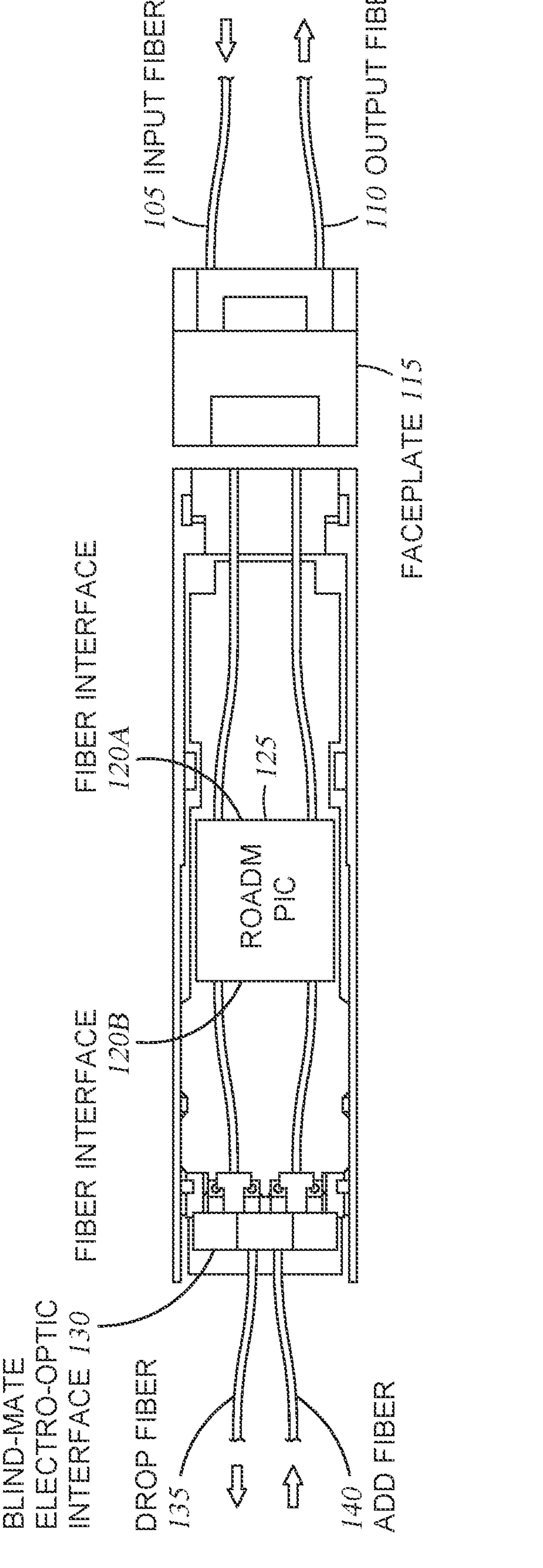
FIG. 1 illustrates a pluggable module including a ROADM implemented in a photonic integrated circuit, according to one embodiment.

FIG. 1 illustrates a pluggable module 100 including a ROADM implemented in a PIC 125, according to one embodiment. That is, the PIC 125 includes a ROADM, and thus, is referred to a ROADM PIC. However, the ROADM PIC 125 can include other optical and electrical devices such as optical modulators, optical switches, waveguides, laser sources, electrical circuitry, etc. which are not associated with the ROADM. Thus, the ROADM PIC 125 is not limited to simply the optical elements for forming a ROADM.

The ROADM PIC 125 can be implemented using any type of semiconductor substrate such as silicon, III-V semiconductors, and the like. The embodiments herein are not limited to any particular type of semiconductor, so long as it permits the formation of a ROADM.

The pluggable module 100 illustrates a pluggable body that includes a faceplate 115 that is an external facing side (e.g., an external interface) of the pluggable module 100, in contrast to a blind-mate electro-optic interface 130 which is the internal facing side (e.g., an internal interface) of the pluggable module 100. That is, the blind-mate electro-optic interface 130 is plugged into a receptacle of a computing system while the faceplate 115 is external facing. For example, the faceplate 115 may protrude from the computing system so that the pluggable module 100 can be grabbed and removed from the receptacle in the computing system (e.g., if the pluggable module 100 fails). However, in other embodiments, the faceplate 115 may be recessed into the computing system.

As shown, the faceplate 115 provides an interface for coupling to an input fiber 105 which provides an optical signal to the pluggable module 100. In this example, the received optical signal includes multiple wavelengths (or wavelength ranges or colors) that form different channels of a WDM optical signal. For example, the received optical signal may include 2-40 different wavelengths or channels which each contain different modulated data.

The pluggable body can include an internal fiber or waveguide that forwards the received optical signal from the faceplate 115 to a fiber interface 120A on the PIC 125. This interface 120A can be implemented using any kind of optical coupler such as a grating coupler, butt coupler (e.g., a prong coupler), one or more lenses, and the like which introduce the optical signal into the PIC 125.

The ROADM in the PIC 125 can add and drop wavelengths or substitute channels in the received WDM optical signal while the remaining, unremoved wavelengths can pass through unaffected. Moreover, the ROADM can adjust or change the add/drop vs. pass-through configuration if traffic patterns change. For example, at one point of time, the ROADM in the PIC 125 may replace two of the wavelengths or channels in the optical signal with two new substitute channels at the same wavelengths. However, at a second point of time, the ROADM can be configured such that it replaces three of the wavelengths or channels with three new channels at the same wavelengths. Or the ROADM can be configured such that it does not replace any of the wavelengths or channels, in which case the received optical signal passes through the PIC 125 having the same channels that it had when it was received. The details of the ROADM in the PIC 125 are discussed in more detail in FIG. 2 below.

The PIC 125 also includes a fiber interface 120B for transmitting wavelengths or channels that are being dropped from the optical signal and receiving new substitute channels at the same wavelengths. This interface 120B can be implemented using any kind of optical coupler such as a grating coupler, a butt coupler, one or more lenses, and the like which couple to internal fibers or waveguides in the pluggable module 100. For example, if the ROADM is currently configured to drop two channels, these two channels are forwarded by the fiber interface 120B to the blind-mate electro-optic interface 130, which is in turn coupled to a drop fiber 135.

The drop fiber 135 can be connected to some other optical and/or electrical component in the computing system containing the pluggable module 100, such as the CPO which is discussed in FIG. 4 below. These optical and/or electrical components can receive the dropped channels and provide new, substitute channels to the blind-mate electro optic interface 130 via an add fiber 140. The new channels are then forwarded to the fiber interface 120B and provided to the ROADM in the PIC 125. The ROADM can then add the substitute channels to the other wavelengths and channels in the received optical signal that were not dropped (e.g., perform WDM) and then transmit the resulting WDM optical signal on the fiber interface 120A to the faceplate 115 and an output fiber 110.

As an example, assume the optical signal received at the input fiber 105 includes 10 different wavelengths or channels. The ROADM may drop two of those channels and receive two new substitute channels at the same wavelength. The ROADM adds the two new channels (which have the same wavelengths as the dropped channel but contain different modulated data) to the other eight wavelengths or channels that were not dropped. The pluggable module 100 then forwards a resulting optical signal on the output fiber 110 that, like the received optical signal, has ten wavelengths or channels where two of the channels have new data but the other eight channels have the same data that was in the optical signal received on the input fiber 105.

In one embodiment, the pluggable module is a SFP. In one embodiment, the pluggable module 100 is hot-pluggable where it can be inserted into a computing system when the computing system is currently powered on and without requiring the computing system to be rebooted (e.g., hot swapping). In one embodiment, the pluggable module has a maximum width 40 mm, a maximum length of 116 mm, and a maximum height of 13 mm. In one embodiment, the pluggable module has a width between 13-40 mm, a length between 45-116 mm, and a height between 8.5-13 mm As a non-limiting example, assume that the pluggable module 100 is installed at a site in City A that is along an optical link between City B and City C. The optical signal (having ten channels) may be sent by City B on the optical link towards City C. However, before reaching City C, the optical signal is first received by the pluggable module 100 at City A. The optical signal may include 2 channels having data destined for locations at City A while the other 8 channel have data destined for locations in City C. The ROADM PIC 125 can remove the two channels that have data for City A but permit the other 8 channels for City C to remain in the optical signal. Further, the ROADM can add two substitute channels (at the same wavelength of the dropped channels) that can have data to be transferred from sources in City A to destinations in City C. Thus, when the optical signal arrives at City C, it now contains two channels containing data sent by sources in City A to destinations at City C and eight channels containing data sent by sources in the City B to destinations at City C.

Also, because the ROADM can be adjusted, as traffic demands change so can the number of wavelengths or channels that are added/dropped by the ROADM PIC 125. For example, if there is less traffic flowing between City B and City A, the ROADM can be reconfigured to drop only one channel so that the other nine channels in the optical signal can be used to transfer data from sources in City B to destinations in City C.

While FIG. 1 illustrates transmitting only optical signal using the blind-mate electro-optic interface 130, the interface 130 can also transmit low-speed electrical signals such as power and control signals between the pluggable module 100 and an external component such as a CPO.

Figure 2:
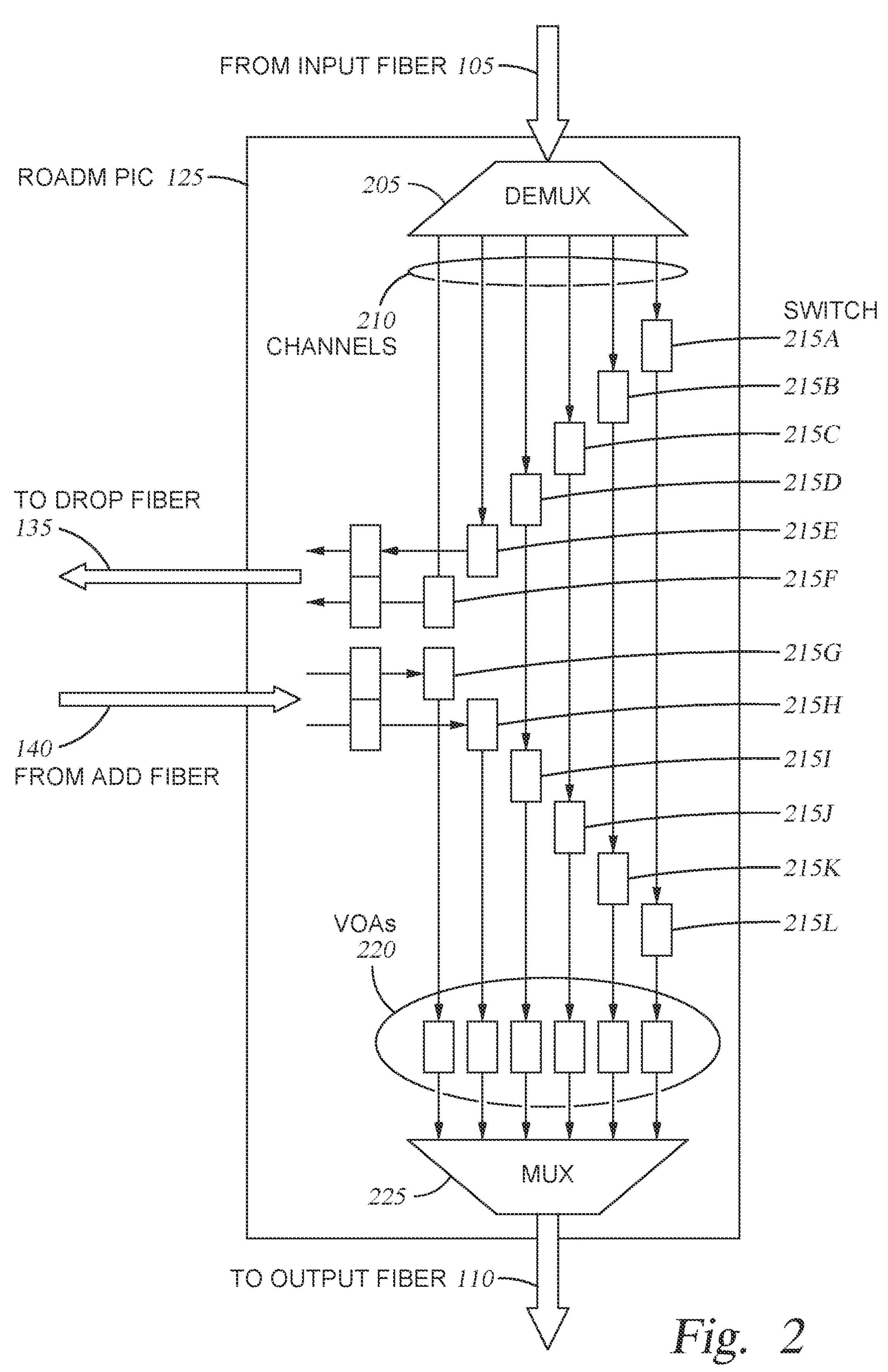
FIG. 2 illustrates a ROADM implemented in a photonic integrated circuit, according to one embodiment.

FIG. 2 illustrates a ROADM implemented in the PIC 125, according to one embodiment. As shown, the ROADM includes a demultiplexer (demux) 205 which receives the WDM optical signal that contains multiple channels 210. The demux 205 separates the optical signal into individual optical signals, each containing one of the wavelengths or channels 210. These individual optical signals are received at respective optical switches 215A-L which are set to either forward the optical signals to other switches 215 or to forward the optical signals to the drop fiber 135. In this example, the received optical signal includes six wavelengths where two of the six wavelengths are forwarded by the switches 215E and 215F to the drop fiber 135 while the other four wavelengths are forwarded by switches 215A-D to respective switches 2151-L.

Moreover, new or substitute wavelengths or channels 210 are received from the add fiber 140 at the switches 215G and 215H. The two switches 215G and 215H forward the new wavelengths or channels, and the other four switches 2151-L forward the remaining four unremoved wavelengths or channels, to respective variable optical amplifiers (VOAs) 220. While optional, the VOAs 220 permit the ROADM to individually amplify the wavelengths or channels. This may provide greater flexibility where some wavelengths may need more or less amplification than other wavelengths or channels.

The amplified channels are then sent to a multiplexer (mux) 225 which performs WDM to recombine the six wavelengths or channels 210 into a single WDM optical signal which is the forwarded to a next hop in the optical link by the output fiber 110.

The optical components illustrated in FIG. 2 can be fabricated in the PIC 125. In this manner, the ROADM can be implemented in a PIC rather than being formed using discrete optical components. The PIC 125 can then be placed inside a pluggable module such as the one illustrated in FIG. 1.

Figure 3:
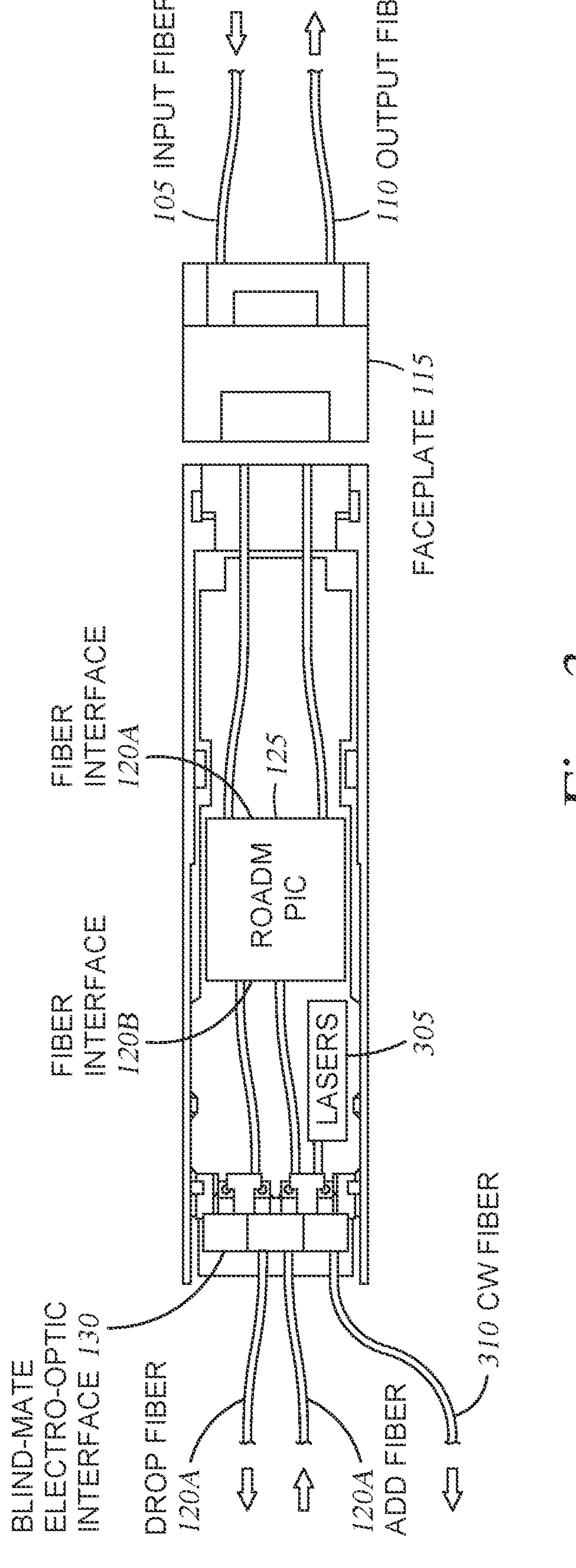
FIG. 3 illustrates a pluggable module including a ROADM and a laser, according to one embodiment.

FIG. 3 illustrates a pluggable module 300 including a ROADM and a laser, according to one embodiment. The pluggable module 300 has many of the same components as the pluggable module 100 in FIG. 1 as indicated by using the same reference numbers. For brevity, these common components are not discussed in detail here.

The pluggable module 300 also includes lasers 305. In one embodiment, the lasers 305 can be continuous wave (CW) lasers that generate CW optical signals which then can be modulated by an external component to include modulated data. The lasers 305 can create a significant amount of heat, and as such, it has become common to dispose laser sources such as the lasers 305 in pluggable modules 300 which are at a periphery of a computing system where it is easier to cool the lasers 305. Moreover, the lasers 305 can fail more often than other components. Thus, placing the lasers 305 in the pluggable module 300 means they can easily be replaced by removing the non-functioning module 300 and plugging in a new module 300.

FIG. 3 illustrates that the lasers 305 can be disposed in the same pluggable module 300 as the ROADM PIC 125. Thus, the pluggable module 300 can serve dual purposes: perform the ROADM function to add and drop channels and provide a CW laser for generating data optical signals. In this example, the output of the lasers 305 is coupled to the blind-mate electro-optic interface 130 which then couples the laser to a CW fiber 310.

While FIG. 3 illustrates that the lasers 305 are separate from the PIC 125, in one embodiment, the PIC 125 may also include laser sources so it can generate the CW optical signals. That is, the PIC 125 can include both a ROADM and a laser.

Figure 4:
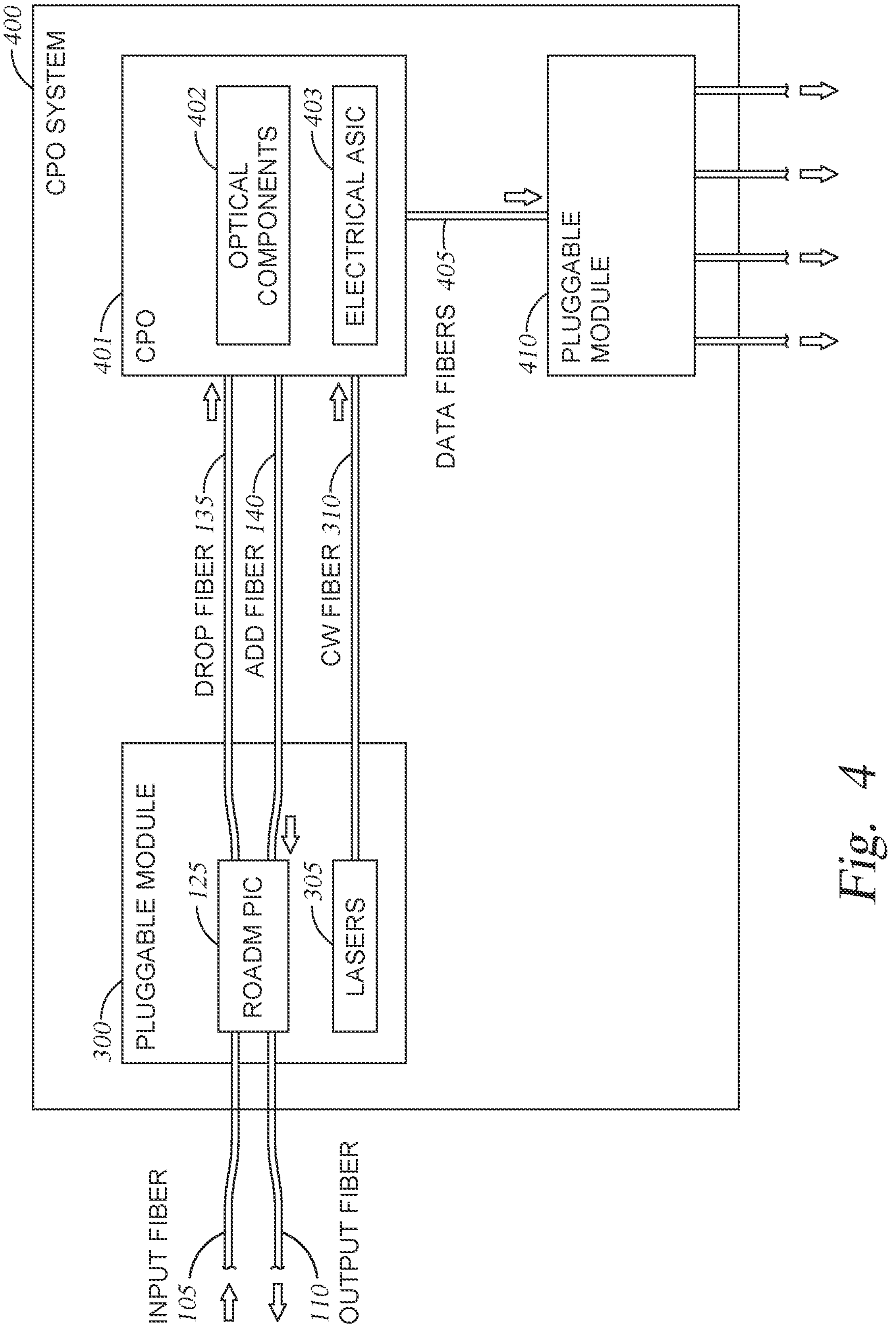
FIG. 4 illustrates a co-packed optical system with multiple pluggable modules, according to one embodiment.

FIG. 4 illustrates a CPO system 400 with multiple pluggable modules, according to one embodiment. In this example, the CPO system 400 (e.g., one example of a computing system) has plugged into it the pluggable module 300 and a pluggable module 410. While two pluggable modules are shown, any number of pluggable modules can be plugged into the CPO system 400. For example, multiple pluggable modules 300 can be plugged into the CPO system 400. In any case, FIG. 4 illustrates at least two different types of pluggable modules being plugged into the CPO system 400. In one embodiment, the CPO system 400 can include cages or receptacles for receiving the pluggable modules 300 and 410, which may be external laser small form factor pluggables (ELSFPs).

As discussed above, the pluggable module 300 receives a WDM optical signal from the input fiber 105 which is then processed by the ROADM PIC 125. One or more of the channels in the WDM optical signal can be dropped and transmitted to a CPO 401. In one embodiment, the CPO 401 is a heterogeneous integration of optics and silicon (e.g., an electrical ASIC) on a single packaged substrate. The CPO 401 can include fiber optic components, digital signal processing (DSP) components, switch ASICs, integrated packaging, and test features. In this example, the CPO 401 includes optical components 402 and an electrical ASIC 403. The optical components 402 can include optical interfaces for connecting to optical fibers that communicate optical signals between the CPO 401 and the pluggable modules 300 and 410. The optical components 402 can also include shapers, splitters, waveguides, optical amplifiers, modulators, photodiodes, and the like.

The electrical ASIC 403 may be an Ethernet switch ASIC. For example, the optical components 402 may convert the optical signals received from the drop fiber 135 (e.g., the dropped wavelengths or channels) into electrical signals which are then sent to an analog front end of the electrical ASIC 403. The ASIC 403 can then process the electrical signals.

To add substitute wavelengths or channels to replace the dropped channels, the electrical ASIC 403 can generate control signals for an optical modulator in the optical components 402 which modulates a CW optical signal received on the CW fiber 310. This substitute optical signal can then be transmitted using the add fiber 140 so it is added to the WDM signal generated by the ROADM PIC 125 as discussed above.

The CPO 401 can also use the CW optical signal generated by the lasers 305 to generate data optical signals which are then transmitted by data fibers 405 to a blind-mate interface of the pluggable module 410. Unlike the pluggable module 300, the pluggable module 410 may not include a ROADM PIC 125 or lasers 305. Instead, the pluggable module 300 may be used to transmit the data optical signals to other computing systems.

FIG. 4 illustrates how a pluggable module 300 containing a ROADM PIC 125 can be used in a CPO system 400 to add and drop channels, where the dropped and added channels can be sent to the CPO 401. However, the pluggable module 300 can be used in other types of computing systems besides the CPO system 400. Further, the pluggable module 100 in FIG. 1 (which does not include lasers 305) could be used in the CPO system 400. In that case, a different pluggable module (e.g., the pluggable module 410) may include laser sources for providing CW optical signals to the CPO 401. Or the laser sources may be part of the CPO 401, although this means it loses the cooling advantages and the ability to be easily replaced when the lasers are disposed in pluggable modules.

Figure 5:
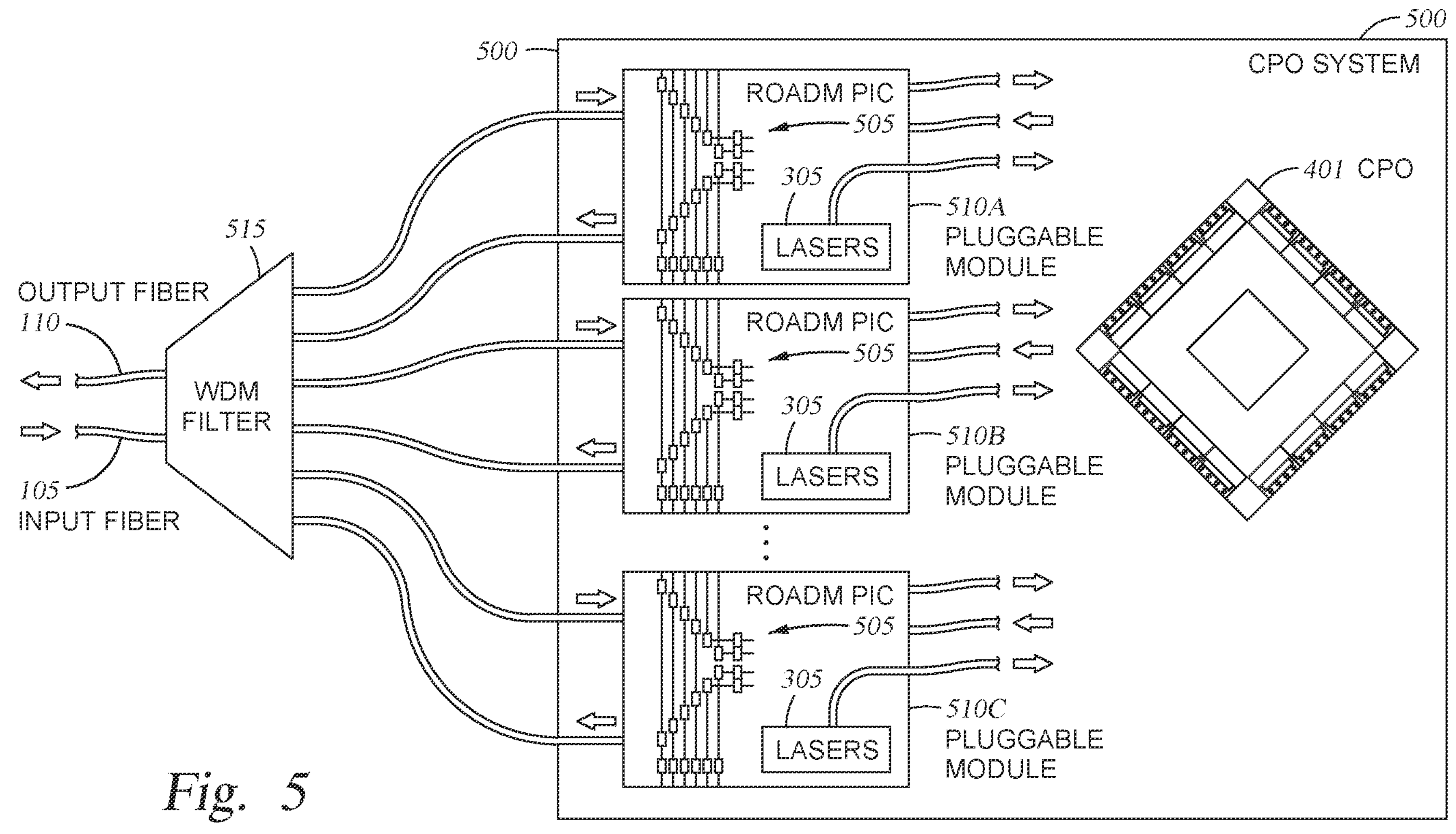
FIG. 5 illustrates a co-packed optical system with multiple ROADM pluggable modules, according to one embodiment.

FIG. 5 illustrates a CPO system 500 with multiple ROADM pluggable modules 510, according to one embodiment. In this example, pluggable modules 510A-C are plugged into the CPO system 500. Each of the pluggable modules 510 includes a ROADM PIC 505 and lasers 305, although in other examples, the module 510 may not include the lasers 305.

FIG. 5 also illustrates a WDM filter 515 which receives the WDM optical signal from the input fiber 105. In this example, the WDM optical signal may include more channels than any one of the ROADM PICs 505 can handle. For example, the WDM optical signal may include 18 wavelengths or channels but each ROAD PIC 505 can process only 6 wavelengths or channels. In this case, the WDM filter 515 can separate the 18 wavelengths in the received WDM signal into multiple sets of channels so that only 6 wavelengths or channels are sent to each of the ROADM PICs 505 (i.e., each pluggable modules 510). The ROADM PICs 505 can then add and drop channels using the CPO 401 and return the remaining, unremoved channels and any added substitute channels to the WDM filter 515. The WDM filter 515 can then recombine the sets of channels received from the pluggable modules 510 into a single WDM optical signal and transmit it in the output fiber 110.

FIG. 5 enables the CPO system 500 to handle a WDM optical signal that has more wavelengths or channels than any one ROADM PIC 505 can process. This provides scalability where the number of pluggable modules 510 can vary as the number of channels in the WDM optical signal changes. Moreover, it may be easier or more cost effective to manufacture ROADM PICs 505 that process smaller number of wavelengths or channels than a ROADM PIC 505 that can process large numbers of channels. Or the size of the ROADM PICs 505 may be limited in order to fit into a SFP pluggable module, in which case, the ROADM PICs 505 can process only a limited number of channels. Regardless, by the addition of the WDM filter 515, the CPO system 500 can process a received WDM optical signal with any number of channels by adding additional pluggable modules 510.

Moreover, by using the external WDM filter 515, the ROADMs in the PICs 505 do not need the demux 205 and the mux 225 as discussed in FIG. 2. Put differently, the WDM filter 515 can perform the demux and mux functions of those components so that the ROADMs can be smaller than the ROADMs in FIG. 2.

Figure 6:
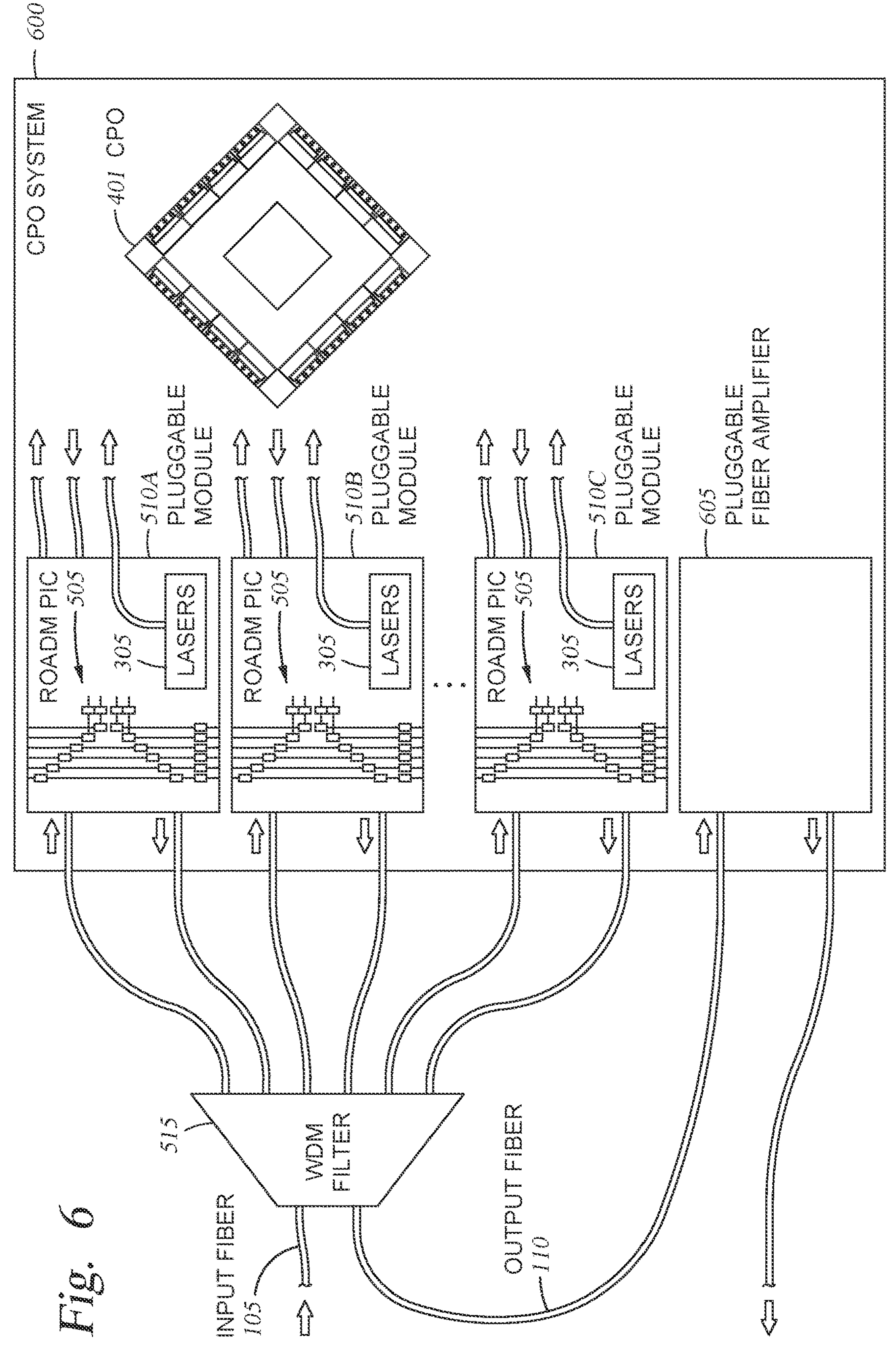
FIG. 6 illustrates a co-packed optical system with multiple ROADM pluggable modules and a pluggable fiber amplifier, according to one embodiment.

FIG. 6 illustrates a CPO system 600 with multiple ROADM pluggable modules and a pluggable fiber amplifier, according to one embodiment. The CPO system 600 has many of the same components as those in FIG. 5 as indicated by using the same reference numbers. Like in FIG. 5, the CPO system 600 can vary the number of pluggable modules 510 in response to the number of wavelengths or channels in the WDM optical signal received at the WDM filter 515.

FIG. 6 also illustrates a pluggable fiber amplifier 605 which can amplify the WDM optical signal output by the WDM filter 515. That is, after combining each of the six channels received from the pluggable modules 510, the WDM optical signal can be amplified by the pluggable fiber amplifier 605 before then being output to a downstream component. Advantageously, the pluggable fiber amplifier 605 can amplify the WDM optical signal as a whole while the VOAs in the ROADM PICs 505 can individually amplify the channels. For example, the pluggable fiber amplifier 605 may provide a much larger amplification on the WDM optical signal than can be provided by the VOAs; however, this amplification may not be the same for all the wavelengths. The VOAs can be used to then provide a fine-tuned amplification so that the wavelengths have substantially the same power (e.g., where some VOAs may amplify a wavelength more than other VOAs). Thus, this arrangement can achieve greater flexibility to adjust the power in the different wavelengths.

Alternatively, using the pluggable fiber amplifier 605 can mean the VOAs in the ROADM PICs 505 can be omitted. Thus, the ROADMs in the PICs 505 could be smaller, or could be less costly.

In another embodiment, rather than amplifying the WDM optical signal after it has passed through the ROADM PICs 505 and then been recombined by the WDM filter 515, the input fiber 105 could instead be coupled to the pluggable fiber amplifier 605 so that the received WDM signal is amplified before being forwarded to the WDM filter 515 where the wavelengths are then separated and transmitted to the pluggable modules 510. Again, the ROADM PICs 505 can also include VOAs for individually amplifying the channels, or they may not. The channels can then be recombined by the WDM filter 515 and output on the output fiber 110 without passing through the pluggable fiber amplifier 605 a second time.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In view of the foregoing, the scope of the present disclosure is determined by the claims that follow.

We claim:

1. A pluggable module, comprising:

a pluggable body; and a photonic integrated circuit (PIC) disposed in the pluggable body comprising a reconfigurable optical add-drop multiplexer (ROADM) further comprising:

a demultiplexer arranged to receive an optical signal from an input fiber, wherein the demultiplexer separates the optical signal into a plurality of individual optical signals each containing one of a plurality of channels;

a first plurality of optical switches arranged to receive one of the plurality of individual optical signals;

a second plurality of optical switches, wherein at least one of the second plurality of optical switches is arranged to receive a first respective individual optical signal of the plurality of individual optical signals from one of the first plurality of optical switches, wherein at least one of the first plurality of optical switches is arranged to transmit a dropped channel to a drop fiber, and wherein at least one of the second plurality of optical switches is arranged to receive a substitute channel to replace the dropped channel from an add fiber; and a multiplexer arranged to combine the substitute channel and the first respective individual optical signal into a resulting optical signal that is output to an output fiber.

2. The pluggable module of claim 1, wherein the optical signal is a wavelength division multiplexing (WDM) optical signal, wherein the pluggable body comprises an external interface configured to receive multiple channels the WDM optical signal, and wherein the ROADM is configured to drop one of the multiple channels from the WDM optical signal.

3. The pluggable module of claim 2, wherein the pluggable body comprises an internal interface configured to receive the dropped channel from the PIC and forward the dropped channel on the drop fiber.

4. The pluggable module of claim 3, wherein the internal interface is configured to (i) receive the substitute channel from the add fiber and (ii) forward the substitute channel to the PIC, wherein the ROADM is configured to forward the substitute channel and any unremoved channels in the WDM optical signal to the external interface.

5. The pluggable module of claim 4, wherein the ROADM does not remove at least one of the plurality of channels from the WDM optical signal, wherein the external interface is configured to (i) receive the unremoved channels from the PIC and (ii) forward the unremoved channels without the unremoved channels passing through the internal interface.

6. The pluggable module of claim 3, wherein the internal interface is a blind-mate interface on a first side of the pluggable body, wherein the external interface is a faceplate on a second side of the pluggable body, and wherein the first side of the pluggable body is opposite the second side of the pluggable body.

7. The pluggable module of claim 3, further comprising:

a laser source configured to transmit a continuous wave (CW) optical signal to the internal interface, wherein the internal interface is configured to forward the CW optical signal on the add fiber.

8. The pluggable module of claim 1, wherein the pluggable module is at least one of a Small Form-factor Pluggable (SFP), External Laser Small Form Factor Pluggable (ELSFP), quad small form factor pluggable (QSFP), or Octal Small Form Factor Pluggable (OSFP) that is hot pluggable into a computing system.

9. A system, comprising:

a wavelength division multiplexing (WDM) filter arranged to demultiplex a received WDM optical signal into a plurality of sets of channels; and a computing system comprising a plurality of pluggable modules, wherein each of the plurality of pluggable modules is arranged to receive a respective set of the plurality of sets of channels from the WDM filter, and wherein each of the pluggable modules further comprises a photonic integrated circuit (PIC) disposed in a pluggable body comprising a reconfigurable optical add-drop multiplexer (ROADM) further comprising:

a demultiplexer arranged to receive an optical signal from an input fiber, wherein the demultiplexer separates the optical signal into a plurality of individual optical signals each containing a channel from the respective set of channels;

a first plurality of optical switches arranged to receive one of the plurality of individual optical signals;

a second plurality of optical switches, wherein at least one of the second plurality of optical switches is arranged to receive a first respective individual optical signal of the plurality of individual optical signals from one of the first plurality of optical switches, wherein at least one of the first plurality of optical switches is arranged to transmit a dropped channel to a drop fiber, and wherein at least one of the second plurality of optical switches is arranged to receive a substitute channel to replace the dropped channel from an add fiber; and a multiplexer arranged to combine the substitute channel and the first respective individual optical signal into a set of channels that is output to the WDM filter.

10. The system of claim 9, wherein the computing system comprises:

co-packaged optics (CPO) configured to:

receive dropped channels from the plurality of pluggable modules; and provide substitute channels to the plurality of pluggable modules to replace the dropped channels.

11. The system of claim 10, wherein the CPO comprises:

optical components; and an electrical application specific integrated circuit (ASIC).

12. The system of claim 11, wherein the electrical ASIC comprises an Ethernet switch ASIC.

13. The system of claim 9, wherein the WDM filter is configured to receive sets of channels from the plurality of pluggable modules and combine the sets of channels into an output WDM optical signal.

14. The system of claim 13, further comprising:

a pluggable fiber amplifier in the computing system, wherein the pluggable fiber amplifier is configured to amplify either the received WDM optical signal before being received by the WDM filter or the output WDM optical signal.

15. A computing system, comprising:

a co-packaged optics (CPO); and a pluggable module comprising:

a pluggable body; and a photonic integrated circuit (PIC) comprising a reconfigurable optical add-drop multiplexer (ROADM) further comprising:

a demultiplexer arranged to receive an optical signal from an input fiber, wherein the demultiplexer separates the optical signal into a plurality of individual optical signals each containing one of a plurality of channels;

a first plurality of optical switches arranged to receive one of the plurality of individual optical signals;

a second plurality of optical switches, wherein at least one of the second plurality of optical switches is arranged to receive a first respective individual optical signal of the plurality of individual optical signals from one of the first plurality of optical switches, wherein and at least one of the first plurality of optical switches is arranged to transmit a dropped channel to the CPO through a drop fiber, and wherein at least one of the second plurality of optical switches is arranged to receive a substitute channel to replace the dropped channel from an add fiber through the CPO; and a multiplexer arranged to combine the substitute channel and the first respective individual optical signal into a resulting optical signal that is output to an output fiber.

16. The computing system of claim 15, wherein the optical signal is a wavelength division multiplexing (WDM) optical signal, wherein the pluggable module comprises an external interface configured to receive multiple channels of the WDM optical signal, and wherein the dropped channel is one of the multiple channels from the WDM optical signal.

17. The computing system of claim 16, wherein the pluggable module comprises an internal interface configured to receive the dropped channel from the PIC.

18. The computing system of claim 17, wherein the internal interface is configured to (i) receive the substitute channel from the add fiber coupled to the CPO and (ii) forward the substitute channel to the PIC, wherein the ROADM is forward the substitute channel and any unremoved channels in the WDM optical signal to the external interface.

19. The computing system of claim 18, wherein the ROADM does not remove at least one of the plurality of channels from the WDM optical signal, wherein the external interface is configured to (i) receive the unremoved channels from the PIC and (ii) forward the unremoved channels without the unremoved channels passing through the internal interface.

* * * * *